N. MACNEALE.
ELECTRIC WELDING MACHINE.
APPLICATION FILED DEC. 31, 1913.

1,093,281.

Patented Apr. 14, 1914.

WITNESSES.
J. O. Hilkey
F. E. Aul

INVENTOR
Neal Macneale,
By Owen, Owen & Crampton,
His attys.

UNITED STATES PATENT OFFICE.

NEIL MACNEALE, OF CINCINNATI, OHIO, ASSIGNOR TO THE TOLEDO ELECTRIC WELDER COMPANY OF CINCINNATI, OHIO, A CORPORATION OF OHIO.

ELECTRIC WELDING-MACHINE.

1,093,281.

Specification of Letters Patent.     Patented Apr. 14, 1914.

Application filed December 31, 1913. Serial No. 809,716.

*To all whom it may concern:*

Be it known that I, NEIL MACNEALE, a citizen of the United States, and a resident of Cincinnati, in the county of Hamilton and State of Ohio, have invented a certain new and useful Electric Welding-Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to electric welding machines, and particularly to the die-carrying horns of spot-welding machines, but is not restricted to such use, as it may be employed in any connection for which it may be adapted or appropriate.

It is found in electric welding that it is very desirable for cooling purposes to have the die-points as near to the horns or parts carrying the dies as the nature of the work acted on will permit, the points staying cooler when located close to the horns than when extended a considerable distance therefrom. It is also found desirable to provide means for varying the distance between the die carrying portions of a pair of associated horns, so that when flat work is being welded the horns may be placed relatively close together to shorten the length of projection of the dies therefrom, and when boxes or work of a similar nature are being welded the distance between the horns may be varied to accommodate the work.

The object of my invention is to provide a pair of horns of the character described, which are relatively adjustable to vary the space therebetween to suit the nature of the work being acted on, whereby the die-points may have minimum lengths of projection from the horns as the work acted on may require, and the maximum cooling efficiency of the dies secured for different types of work.

The invention is fully described in the following specification, and while, in its broader aspect, it is capable of embodiment in numerous forms, a preferred embodiment thereof is illustrated in the accompanying drawings, in which,—

Figure 1:
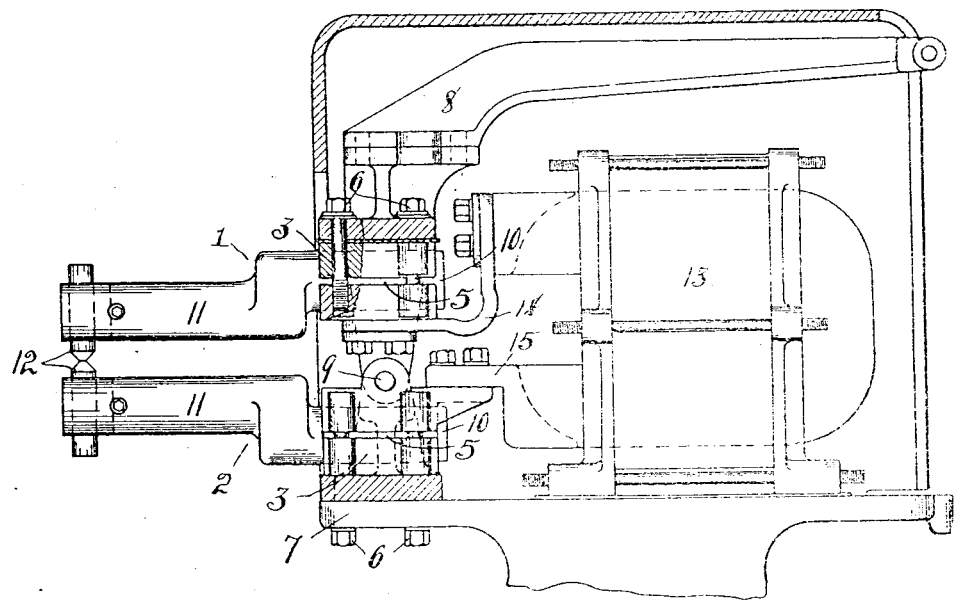
Figures 2, 3:
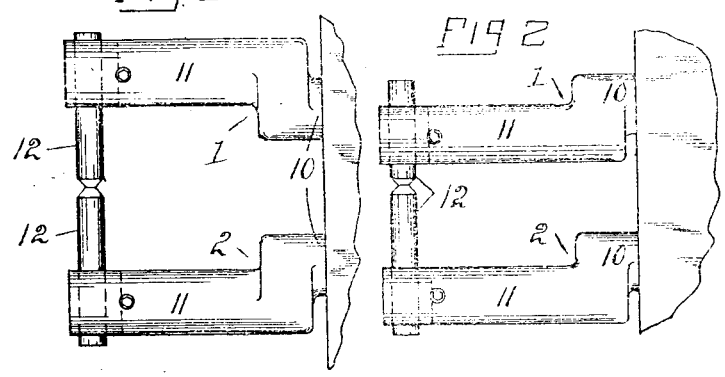
Figure 4:
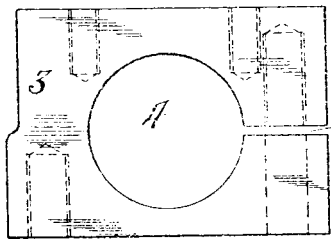

Figure 1 is a side elevation of a portion of an electric welding machine equipped with my invention, with the horns in their closest position of relative adjustment and with the parts in section. Figs. 2 and 3 are similar views of the horns in different positions of adjustment, and Fig. 4 is an elevation of one of the horn clamping blocks.

Referring to the drawings, 1 and 2 designate the upper and lower horns, respectively of an electric welding machine, and 3, 3 the clamping blocks by which they are respectively held for rotary adjustment. Each of these blocks is provided with an opening 4 therein for receiving the inner end of the respective horn 1, 2 for rotary adjustment therein, and is split at one side, as at 5, to facilitate a clamping of the horn by the block upon a drawing together of the split portions. The clamping action of each block is accomplished by screws 6, which connect the split parts. These screws also assist in securing the blocks 3 to their carrying parts. The lower block 3 is shown, in the present instance, as being carried by a fixed part 7 of the machine, while the upper block is carried by a lever 8, which is fulcrumed at 9 and operated in any suitable or convenient manner, as is well understood in the art, thus enabling the horns to have relative jaw-like movements.

In carrying out the features of my invention, I preferably provide each horn 1, 2 with a shank or trunnion portion 10 for fitting into the associated block 3, and with an outer end portion 11, which is transversely offset from, or of crank-form, relative to the shank part, as shown. A welding-die 12 is removably carried by the part 11 of each horn, and projects transversely thereof in the plane of lateral projection or offsetting of the part 11 from the shank part 10 of the horn, and is capable of having its welding point projected in either of opposite directions from the horn.

When flat work is being welded the horns are turned so that the offset parts 10 thereof are projected toward each other and the minimum space provided therebetween. When the horns are in this position each die point projects only a short distance from the horn, for instance, ¾ of an inch, so that in such case the combined length of projection of the two dies from the horns is only 1½ inches. If boxes or similar work are to be welded the offset portions of either or both horns can be placed in its outer position of adjustment, so as to vary the distance therebetween as the nature of the work may require, the dies being changed accordingly, as shown in Figs. 2 and 3. It is thus evident that if both horns of the machine are provided with offset die-carrying portions, three different spacings between such portions can be obtained.

13 designates the transformer of the machine, the leads 14 and 15 of which are connected to the respective clamping blocks 3, 3 as shown.

I wish it understood that my invention is not limited to any specific construction, form or arrangement of the parts, except in so far as such limitations are specified in the claims.

Having thus described my invention, what I claim as new, and desire to secure by Letters Patent, is,—

1. In an electric welding machine, a horn having a laterally-offset die-carrying portion and being adjustable about a longitudinal axis.

2. In an electric welding machine, a horn having a laterally-offset die-carrying portion and adjustable to place the offset portion at different positions relative to its longitudinal axis.

3. In an electric welding machine, a horn having a laterally-offset die-carrying portion, and means carrying the horn for rotatable adjustment about its longitudinal axes.

4. In an electric welding machine, a horizontally projecting die-carrying horn angularly adjustable to vary the vertical position of its die-carrying portion.

5. In an electric welding machine, a pair of die-carrying parts, one of which is rotatably adjustable to vary the alining space between the die-carrying parts thereof.

6. In an electric welding machine, a pair of horizontally projecting die-carrying members each having connection with a source of electric current supply and one member having a laterally offset die-carrying portion and being angularly adjustable to vary the vertical position of the die-carrying portion thereof with respect to the other member.

7. In an electric welding machine, a pair of associated horns each being angularly adjustable and having a laterally-offset die-carrying portion.

8. In an electric welding machine, a pair of horns each having a laterally-offset die-carrying portion, and separate means carrying said horns for relative adjustment about their respective axes.

9. In an electric welding machine, a pair of horns each mounted for turning adjustment relative to the other and having a die-carrying portion which is laterally offset relative to its turning axes, and a welding-die removably carried by each offset portion and extending in the plane of lateral projection thereof.

10. In an electric welding machine, a fixed and a pivotally movable clamp, a horn carried for rotary adjustment by each clamp and having a die-carrying portion which is laterally-offset from its axis of adjustment, and a die removably carried by the offset portion of each horn and projecting therefrom in the plane of lateral projection of such portion.

In testimony whereof, I have hereunto signed my name to this specification in the presence of two subscribing witnesses.

NEIL MACNEALE.

Witnesses:
PEARL DUNKMAN,
ROBERT CLARK PIERCE.